United States Patent [19]

Crook, Jr. et al.

[11] 4,102,295
[45] Jul. 25, 1978

[54] LOAD INDICATING APPARATUS

[75] Inventors: Edward J. Crook, Jr., Tulsa; Charles R. Garrett, Collinsville, both of Okla.

[73] Assignee: American Hoist & Derrick Company, St. Paul, Minn.

[21] Appl. No.: 706,686

[22] Filed: Jul. 19, 1976

Related U.S. Application Data

[63] Continuation of Ser. No. 573,438, May 1, 1975, abandoned.

[51] Int. Cl.² .............................................. B66C 1/40
[52] U.S. Cl. ...................... 116/114 R; 116/DIG. 34; 177/147; 177/232; 294/82 R
[58] Field of Search ............. 177/147, 145, 233, 232, 177/225, 234; 116/68, 114 R, 114 AJ, 124 AD, 129 E, DIG. 34; 294/82 R

[56] References Cited

U.S. PATENT DOCUMENTS

| 1,111,560 | 9/1914 | Brown | 177/147 |
|---|---|---|---|
| 1,797,772 | 3/1931 | Hickman | 116/129 E |
| 1,807,752 | 6/1931 | Poster | 116/129 E X |
| 1,860,647 | 5/1932 | Bevier | 177/234 |
| 1,940,057 | 12/1933 | McLaughlin | 177/147 X |
| 2,283,354 | 5/1942 | Dalzell | 116/68 |
| 2,488,042 | 11/1949 | Thun | 177/127 |
| 2,703,980 | 3/1955 | Tell | 177/225 X |
| 3,497,023 | 2/1970 | Ramis | 177/147 |

Primary Examiner—Joseph W. Hartary
Attorney, Agent, or Firm—Burd, Braddock & Bartz

[57] ABSTRACT

A load indicator is connected between a load line and a load handling member such as a hook. The indicator includes a hollow cylindrical housing, a plunger assembly including a transverse head slidably mounted in the housing, a pilot rod integral with the head and extending to a location outside the housing, means connecting a first end of the housing opposite the plunger rod and means connecting the plunger rod to the load line and to the load handling member, and a compression spring in the housing urging the plunger head toward the first end of the housing. The wall of the housing has several sight openings therethrough. A sight band of contrasting color is fixed to move with the plunger assembly inside the housing and to be visible through the sight openings. The spring is of strength to allow sufficient movement of the sight band so that a first color fills all of the sight openings when the load tensioning the load line, the indicator, and the load handling member reaches a predetermined rated value, and so that progressively less of the first color can be viewed through the sight openings as the tensioning load is reduced and the plunger head moves toward the first end of the housing.

9 Claims, 9 Drawing Figures

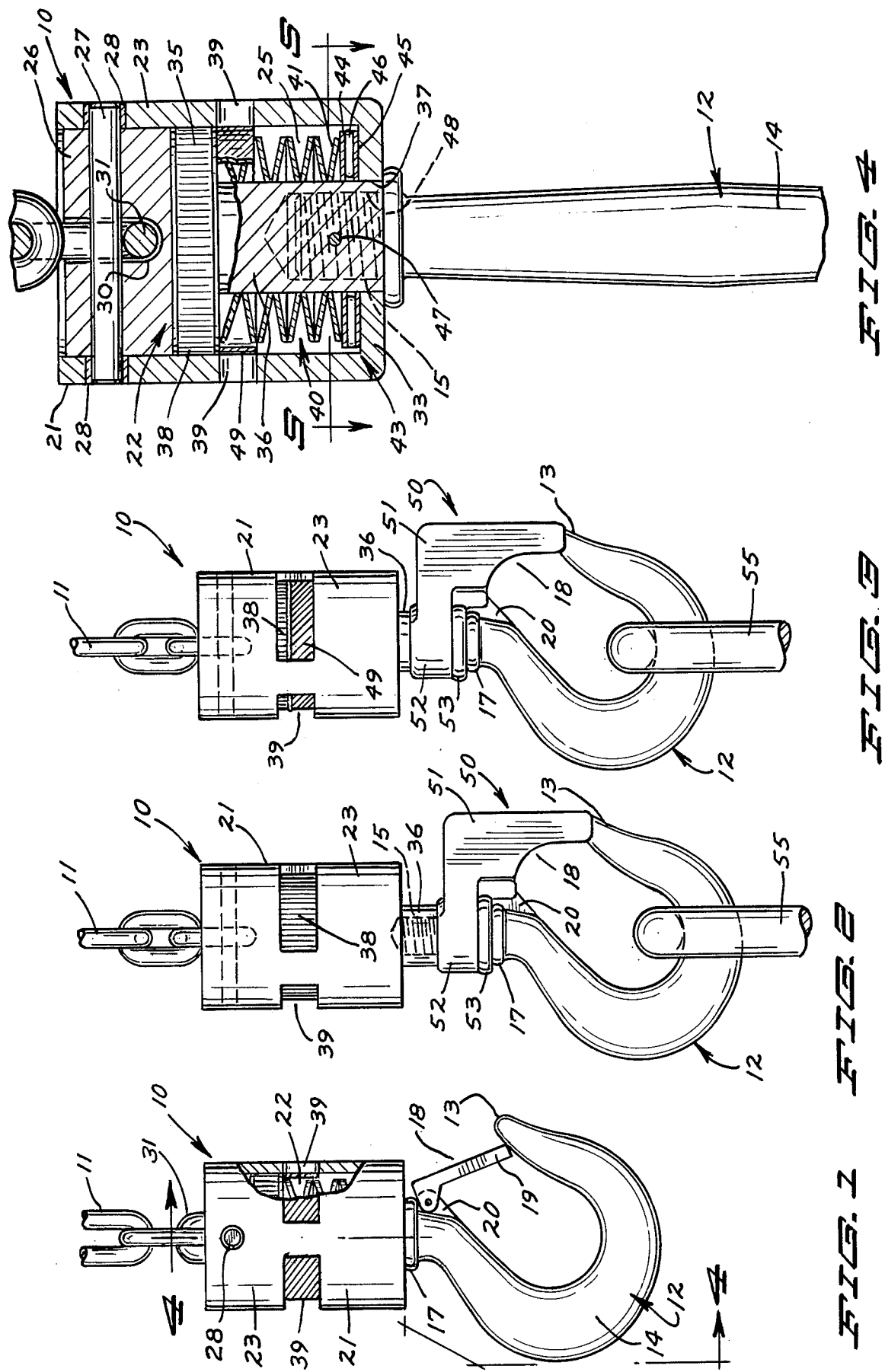

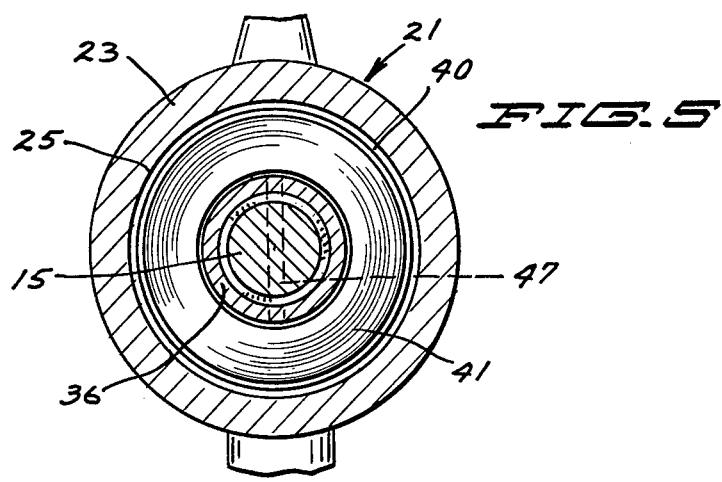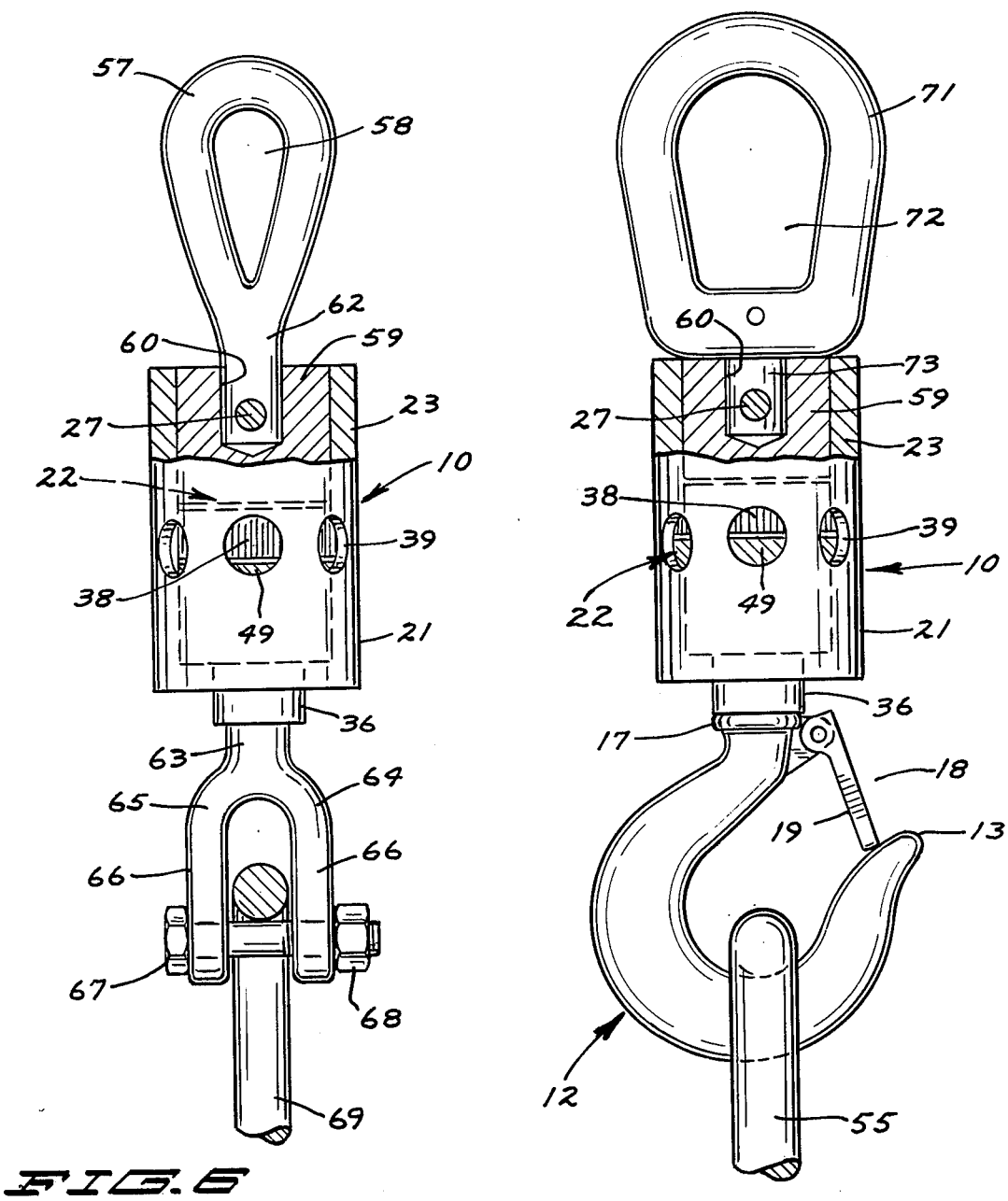

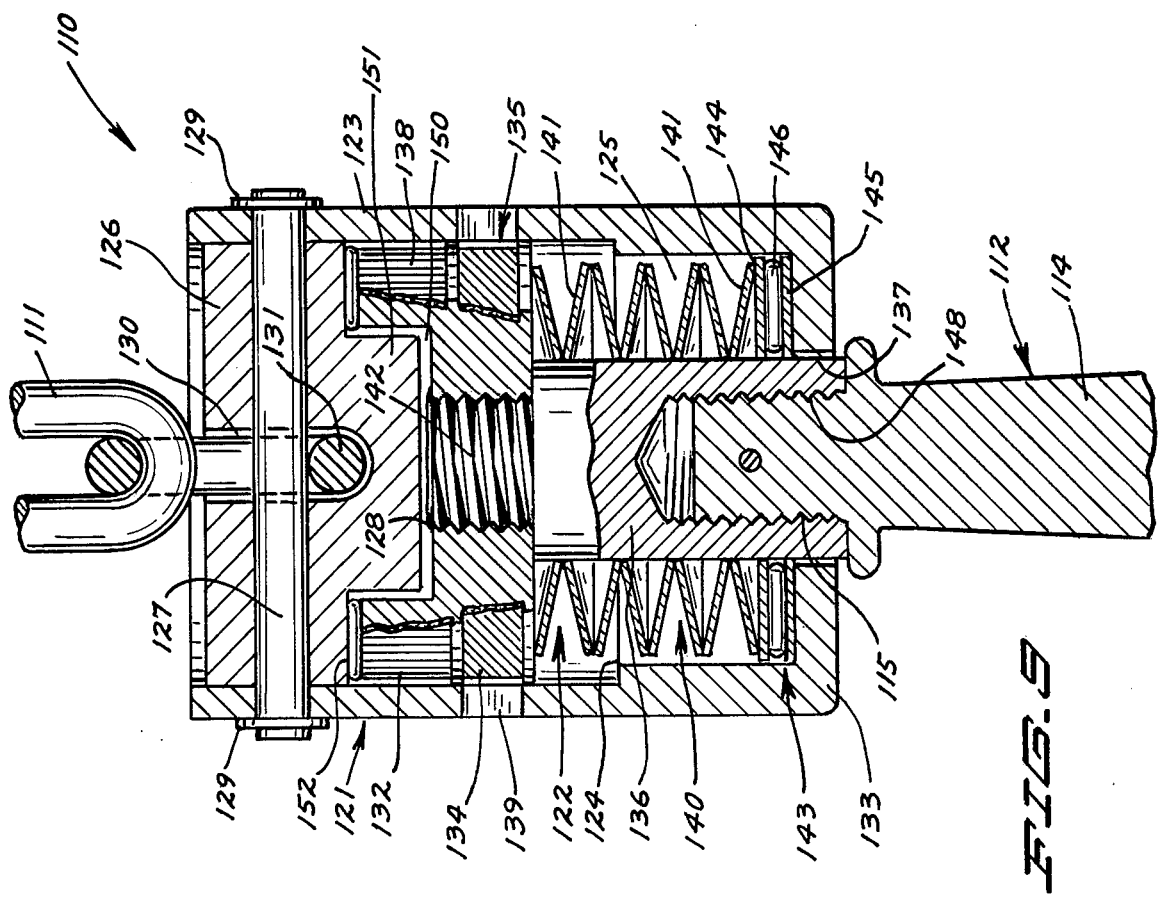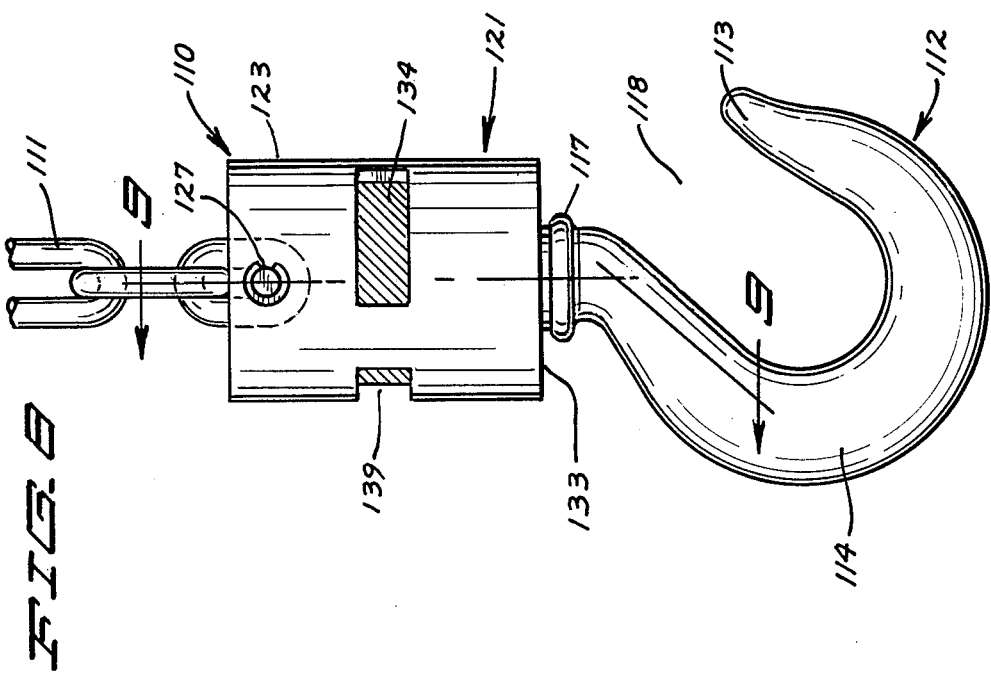

LOAD INDICATING APPARATUS

This is a continuation of application Ser. No. 573,438 filed May 1, 1975, now abandoned.

BACKGROUND OF THE INVENTION

In the operation of a load lifting machine such as an overhead hoist or a self-propelled crane, a safety hazard warranting due attention is that of overloading the machine or attempting to raise and handle a load which is beyond the rated capacity of the machine or machine components. Such overloading is apt to result, for example, in component failure of the lifting equipment. In order to warn of impending overload, various overload indication and protection devices have been devised, as those in Hawkins et al. U.S. Pat. No. 3,728,502 issued Apr. 17, 1973 and Sandberg U.S. Pat. No. 3,802,379 issued Apr. 9, 1974. Such devices, for example, employ electric circuitry to shut off the power to the electric hoist motor when an overload condition is sensed, thus preventing use of the hoist beyond overload capacity. An overload condition can be sensed by calibrated rupture of a component, such as a shear pin, which must then be replaced to again render the machine operable. Meantime, a load can be perilously suspended on the load line of the machine. These devices are typically complex and expensive. Many require a load readout device, as a gauge, located remote from the load. The operator must divert his attention from the load and load line to read the device.

Generally speaking, the larger the load to be lifted, the greater the care and accuracy exercised in estimating the load to be lifted, and consequently, a less chance of accidental overload. For example, if a 25 ton load is to be lifted, the care exercised in estimating the load to be lifted is much greater than if a 2 ton load is to be lifted. Thus, the greater propensity to overload occurs in the use of the smaller lifting machines as the ½ to 5 ton capacity range which are typically not equipped with sophisticated and expensive load indicating equipment. These smaller lifting machines serve, for the most part, as universal tools, being called upon to lift a large variety of loads and perform a large variety of jobs. A load indicator for such machines should be readable by the operator without removing his attention from the load and load line. Types of lifting members employed by these machines vary considerably, from a single hook to a duplex hook, a jaw and eye swivel, and the like. It is beneficial, therefore, to provide a load indicating device usable also with larger lifting machines, but particularly adapted to these smaller machines which are more prone to overload. The device must be informative and easily read, yet compact and adaptable for use with a variety of differing lifting configurations. Further, the device should withstand overload, as is sometimes occasioned by accelerating or handling a load, without being rendered inoperable.

SUMMARY OF THE INVENTION

The invention relates to a load indicator of the type described, connectable between the load line of the lifting machine and the load handling member to visually indicate the load being handled. The load indicator includes two sections movable relative to one another against the bias of a deflectable bias means and in response to the influence of a load on the load handling member. One section is connected to the load line, the other to the load handling member. One section includes a housing having outer walls defining a chamber. The other section includes a deflectable plunger assembly having a head or plunger member movably located in the chamber, and a rod connected to the member extending to outside of the chamber. One or more sight openings on the normally vertical side walls of the housing permit viewing a portion of the plunger assembly from a position outside of the housing. The head member positions a sight band to be visible through the housing opening and movable with said head member. The sight band is intermediately movable between a first position out-of-view through the opening and a second position totally covering the opening. Deflectable bias means are disposed between a portion of the plunger assembly and a portion of the housing, bearing against the member and an end wall of the housing in the chamber. In the relaxed or no-load state, the sight band is biased in a first of said positions adjacent the first end of the housing. Responsive to a tension loading between the line and the load handling member, the sight band moves toward a second of said positions. The size of the sight openings, or the necessary amount of travel of the sight band to move between the first and second positions, and the force or spring constant of the bias means are calibrated according to a rated load capacity. A complete movement between positions by the sight band, as viewed through the sight opening, indicates that the load on the load line has reached that rated load capacity. A partial covering of the sight openings by the sight band is indicative of a proportionate load being handled by the line as compared to the rated load capacity.

In the form of the invention as shown, the sight band on the member of the plunger assembly is color coded whereby the machine operator views a color interface through the openings in the housing. As shown, there are also several sight openings around the housing and the load indicating apparatus has a swivel capability, thereby lending greater versatility to the device while allowing the load indication to be visible at all times.

IN THE DRAWINGS

FIG. 1 is a side elevational view of the load indicator of a first form of the invention, the indicator being in a no-load configuration and with portions removed for illustration, assembled to a load line and a load handling member constituted as a safety hook assembly of the type having a vertically pivotal latch;

FIG. 2 is a side elevational view of the load indicator of the present invention presenting a visual display of a full load and assembled to a load line and to a load handling member constituted as a safety hook assembly of the type having a horizontally pivotal latch;

FIG. 3 is a side elevational view of the load indicator, load line and safety hook assembly of FIG. 2 with the load indicator of the invention presenting a visual display indicating a partial load;

FIG. 4 is an enlarged sectional view of the load indicator, load line and safety hook assembly of FIG. 1 taken along the line 4—4 thereof;

FIG. 5 is a sectional view of the load indicator of FIG. 4 taken along the line 5—5 thereof;

FIG. 6 is a side elevational view of the load indicator of the invention assembled in a load lifting system of the eye and jaw swivel variety, shown as if under partial loading;

FIG. 7 is a side elevational view of the load indicator of the invention assembled in a lifting system of the eye and safety hook variety, illustrating a second variety of eye, shown as if under partial loading;

FIG. 8 is a side elevational view of a load indicator made according to a second form of the invention, the indicator being in a no-load configuration and with portions removed for illustration, the indicator being assembled to a load line and to a load handling member constituted as a hook; and FIG. 9 is an enlarged sectional view of the load indicator, load line and safety hook of FIG. 8 taken along the line 9—9 thereof.

DESCRIPTION OF PREFERRED EMBODIMENTS

There is shown in FIGS. 1 through 7 a form of load indicator 10 made according to a first form of the present invention and assembled with a load line and load handling member or hook for use with a load lifting machine (not shown), such as an electric hoist, a mobile crane, or the like. In FIGS. 1 and 4, indicator 10 displays a no-load indication, in FIG. 2 a full load indication, while in FIGS. 3, 6 and 7 the indicator displays partial load indications, as compared to a predetermined rated load value or the rated load capacity of the load lifting machine or a component thereof.

More specifically referring to FIGS. 1 and 4, load indicator 10 in the normally upright position shown, is connected at its upper end to the lower end of a load line 11 constituted as a link chain, as shown. A hook 12 is fastened to the lower end of indicator 10. Hook 12 is of a standard variety having a tip 13 and a load bearing body portion 14 curving around in generally semi-circular fashion from tip 13 and extending into a weight supporting shank 15. A shoulder 17 occurs at the juncture of the body portion 14 and shank 15. The space between the tip 13 and the end of body portion 14 adjacent shoulder 17 is the hook throat 18. Hook throat 18 is closed by a vertically pivotal safety latch 19 pivoted on a finger 20 projected from body portion 14 adjacent shoulder 17. The movable end of latch 19 contacts tip 13 of hook 12 and is vertically pivotal away therefrom to open the throat 18 for engagement of a load.

Load indicator 10 includes a hollow, cylindrical housing 21, and a plunger assembly indicated generally at 22, located in housing 21 and movable therein for vertical deflection in response to the influence of a load engaged by hook 12. Housing 21 is relatively compact, having a generally cylindrical side wall 23 disposed about a usually upright axis and defining a chamber 25. As shown in FIG. 4, the top end of housing 21 is closed by a chain adapter plug 26 closely positioned within the interior surfaces of side wall 23. Means for connecting housing 21 with load line 11 include a locking pin 27 diametrically orientated with respect to housing 21 and removably disposed in horizontal bores suitably provided in plug 26 and the housing. The ends of pin 27 engage locking sleeves 28 fitted in the bores provided in the side wall 23. A well 30 in the top of plug 26 is advantageously shaped to accommodate a lower link part of a lower link 31 of the chain of load line 11 with lower link 31 engaging pin 27. Chain adapter plug 26 is specifically provided for use with a load chain of the type shown. Adapter plug 26 is readily interchangeable with other adapters to accommodate other types of load line equipment.

The lower end of housing 21 is closed by integral end wall 33. Plunger assembly 22 includes a transverse member or generally cylindrical head 35 having a transverse dimension or diameter slightly less than that of chamber 25 to permit umimpeded vertical movement relative to the interior of wall 23 of housing 21. Head 35 has a visually distinctive sight band constituted as a side wall 38. A generally columnar shaft or pilot rod 36 is concentrically attached to the lower face of head 35 and extends coaxially downwardly through chamber 25 and through a central opening 37 provided in end wall 33.

A plurality of circumferentially aligned sight openings 39 are provided through side wall 23 of housing 21 and so open into chamber 25 to permit viewing of head 35. As shown, sight openings 39 are rectangular in shape to maximize visibility, but can be formed in other advantageous shapes. The purpose of the sight openings 39 is to permit direct and immediate visual determination of the extent of loading by noting through them the relative position of side wall 38 upon deflection of the head 35 in response to loading on the hook 12. Head 35 of plunger assembly 22 is movable in chamber 25 intermediately between a first position entirely out of view through the openings 39 and a second position with only side wall 38 visible through all of each opening 39. Side wall 38 is visually distinguishable from the housing adjacent the periphery of the sight openings 39. Deflectable bias means urges the head 35 toward one position, the first position as shown, to position the side wall 38 out of visual alignment with the openings 39. (See FIGS. 1 and 4). Head 35 is biased under the action of bias means toward a location in the top end of chamber 25 just out of view above the sight openings 39 with an upper face of head 35 bearing against a lower face of adapter plug 26. Deflectable bias means 40 as shown is constituted as a disc spring shown to include a plurality of Belleville washers 41 stacked in alternately facing and opposing relationship. The Belleville washers surround rod 36, as shown in FIG. 5, and have inner and outer dimensions permitting deformation or collapse of the discs without binding on the rod 36 or the inner surfaces of side wall 23. Bias means 40 biases between a lower face of head 35 and an interior surface of end wall 33. In the no-load configuration of FIGS. 1 and 4, bias means 40 exerts sufficient force to hold head 35 toward the top of chamber 25 out of visual alignment through the sight openings 39 against the weight of hook 12. Bias means 40 preferably has a linear load-deflection spring constant. A disc spring, as shown, is preferred as a bias means because of the characteristic low deflection under high load.

Load indicator 10 is optionally equipped with a swivel capability as provided by a bearing assembly 43. (See FIG. 4). Bearing assembly 43 has an upper race 44 and a lower race 45 between which are set suitable bearings, such as needle bearings 46. Lower race 45 bears against the interior surface of end wall 33 of housing 21. The lowermost of the Belleville washers 41 bears against upper race 44 imparting a swivel capability of plunger assembly 22, and hence hook 12, relative to housing 21 and load line 11.

Means provided for the connection of plunger assembly 22 to the load handling member will vary according to the type of load handling member in use. As constituted in FIGS. 1 and 4, shank 15 of hook 12 is of the cylindrical, threaded variety. Rod 36 of plunger assembly 22 has a downwardly open, cylindrical threaded bore 48 specifically adapted to threadably receive shank 15 of hook 12, securely assembling hook 12 toward indicator 10. A locking pin 47 is horizontally disposed in both rod 36 and shank 15 to maintain the assembled relationship.

Side wall 38 is preferably a distinctive color such as red and so forms a first sight band which presents a color interface readily distinguishable through the sight openings 39. As shown, head 35 is provided with a second sight band constituted as a cylindrical sleeve 49 located beneath and comprising an extension of side wall 38. Sleeve 49 is circumferentially coextensive with side wall 38, so as to be visible through openings 39 when aligned therewith. Sleeve 49 is preferably colored in contrast to the color of side wall 38, as green, to present a sharp and readily discernible color interface between the two. Simply by noting the relative positioning of the lower edge of side wall 38 or of the color interface in the sight openings 39, the machine operator immediately ascertains the extent of loading on the load line and hook.

Calibration of indicator 10 is accomplished by coordination of the spring constant of bias means 40 and a vertical positioning of sight openings 39. Load indicator 10 is calibrated whereby, in the no-load configuration, side wall 38 is out-of-view through sight openings 39. In this configuration, sight openings 39 present a display of the color green. The only load carried by the bias means 40 in such a configuration is the load of the hook 12. The load required for deflection of bias means 40 sufficient to first just accomplish a total display of red through the sight openings 39 is equal to the rated load calibration of the indicator. Thus, when the sight openings 39 are first entirely covered by the side wall 38, as when only the color red is first viewed through the openings 39, the rated load calibration of the indicator has been reached. As the bias means 40 has a linear load-deflection characteristic, the proportion of first sight band of side wall 38 visible through openings 39 is indicative of the extent of loading on the load handling member. It may be seen that if an overload condition occurs, the result will be further deflection of bias means 40 toward a flat configuration. This will not cause irreversible damage to load indicator 10. The load indicator 10 simply continues in use. If desired, the top of head 35 of plunger assembly 22 can be equipped with an additional sight band or other visual indicia to indicate the extent of overloading up to the point where the bias means bottoms out between the head 35 and end wall 33.

As illustrated in FIGS. 2 and 3, hook 12 is equipped with a second version of a gate or latch 50 to close the throat 18. Latch 50 has an arm 51 extending from a collar 52 and spanning the throat 18 with an outer end in engagement with the tip 13 of hook 12. Collar 52 is rotatably assembled about the shank 15 of hook 12 permitting rotation of the arm 51 about a horizontal axis coaxial with shank 15 away from the tip 13 to clear the throat 18 for engagement of a load. A locking member 53 also rotatably engages shank 15 of hook 12 beneath the collar 52 and cooperates with the arm 51 and the finger 20 on hook 12 to lock the arm 51 in the closed position, as is known in the art. A load loop 55, partially shown, is engaged by the hook 12 and is connected to a load (not shown). In the hook configuration of FIGS. 2 and 3, load indicator 10 is identical with that shown in FIGS. 1 and 4.

Viewing FIGS. 1 through 4 collectively, the operation of the load indicator 10 may be fully appreciated. In the no-load configurations of FIGS. 1 and 4, the first sight band of side wall 38 of head 33 is out of view through sight openings 39. Through these openings 39, the machine operator perceives a display of totally green generated by the second sight band of sleeve 49. In FIG. 3, there is illustrated a load on the hook 12 which is less than the rated load capacity. Under the influence of the load, side wall 38 of head 35 has moved downward in chamber 25 partially into view through sight openings 39 upon the deflection of bias means 40. The machine operator notes the relative location of the color interface between the side wall 38 and sleeve 49, and immediately sees that the load on hook 12 is less than half of the rated load capacity. In FIG. 2, hook 12 is shown to be loaded to the rated load capacity as only the color red of the first sight band of side wall 38 is visible. This may be due to the weight of the load itself or due to a combination of the dead weight and an acceleration of the load when lifting. In any event, the machine operator immediately perceives the full load condition by noting that the sight openings 39 are totally covered by side wall 38. The machine operator then is able to make any required correction. A major feature of the invention is that, being connected between the load line and the load lifting member, the load indicator is observable by the machine operator while he maintains his attention focused upon the load and load line.

The versatility of load indicator 10 of the invention is further illustrated in FIGS. 6 and 7. In FIG. 6, indicator 10 is installed in an eye-swivel jaw assembly. Tear-drop eye 57 defines a closed loop 58 for connection to a conventional wire rope load line (not shown) or other suitable load line. An adapter plug 59 closes the top of housing 21, in place of the adapter plug 26 of FIGS. 1 through 4. Adapter plug 59 has an upwardly open, cylindrical well 60 for snug receipt of a downwardly extended shank 62 of tear-drop eye 57. Locking pin 27 secures adapter plug 59 and shank 62 in side wall 23. A horizontal, upwardly extended shank 63 of a conventional, load-bearing jaw 64 is threadably assembled to the lower end of rod 36 of plunger assembly 22. Jaw 64 has an inverted, U-shaped body 65 with parallel, spaced apart legs 66, 66. Mutually aligned holes at the lower ends of the legs 66, 66 accommodate a bolt 67 secured by a nut 68. A load bearing link 69 engages the shank of bolt 67 between the legs 66, 66 of jaw 64 and carries a load (not shown). As quickly determined by glancing at load indicator 10, the load carried by jaw 64 is approximately three-quarters of the rated load capacity.

Referring to FIG. 7, an oval type eye 71 defines a loop 72 for engagement with a load line. A shank 73 of eye 71 extends into the well 60 of adapter plug 59, being secured therein and in side wall 23 by locking pin 27. Hook 12 engages the rod 36 of plunger assembly 22 and carries a load loop 55. Hook 12 is the same as described earlier relative to FIGS. 1 and 4. By glancing at the sight openings 39, it is readily determined that the load being carried by hook 12 is approximately 50 percent of the rated load capacity. The machine operator is able to make an immediate assessment that the load carried on the hook 12 is well within a safe region.

Referring to FIGS. 8 and 9, there is shown a load indicator, indicated generally at 110, according to a second form of the invention in a no-load configuration. Load indicator 110 in the normally upright position shown, is connected at its upper end to the lower end of a load line 111 constituted as a link chain, as shown. A hook 112 is fastened to the lower end of indicator 110. Hook 112 is of a standard variety having a tip 113 and a load bearing body portion 114 curving around in generally semi-circular fashion and extending into a weight supporting shank 115. A shoulder 117 occurs at the juncture of the body portion 114 and shank 115. An open unobstructed throat 118 comprises the space between the tip 113 and the end of body portion 114 adjacent shoulder 117.

Load indicator 110 includes a hollow, cylindrical housing 121 having a side wall 123 defining a chamber 125. A plunger assembly, indicated generally at 122, is located in chamber 125 of housing 121 and movable therein for vertical deflection in response to the influence of a load engaged by hook 112. As shown in FIG. 9, the top end of housing 121 is closed by a chain adapter plug 126 closely positioned within the interior surfaces of side wall 123. A locking pin 127 is diametrically orientated with respect to housing 121 and removably disposed in horizontal bores suitably provided in plug 126 and in the housing 121. The outer ends of pin 127 extend slightly outward from side wall 123 of housing 121. Snap rings 129 on either end of pin 127 retain pin 127 in assembled relationship relative to housing 121. A well 130 in the top of plug 126 is shaped to accommodate part of lower link 131 of the chain of load line 111 with lower link 131 engaging pin 127. Adapter plug 126 is readily interchangeable with other adapters to accommodate other types of load line equipment.

The lower end of housing 121 is closed by integral end wall 133. Plunger assembly 122 includes a transverse member or generally cylindrical head 135. Head 135 has a side wall 138 carrying visually distinctive first and second sight bands 132 and 134. A pilot rod 136 has an interior threaded end 142 centrally and threadably assembled to head 135. The top of end 142 is welded to head 135 as at 128. Pilot rod 136 extends coaxially downward through chamber 125 and through a central opening 137 provided in end wall 133.

A plurality of circumferentially aligned sight openings 139 are provided through side wall 123 to permit viewing of head 135. Sight openings 139 permit direct and immediate visual determination of the extent of loading by noting through them the relative position of the sight bands 132, 134 upon deflection of the head 135 in response to leading on the hook 112.

A plurality of Belleville washers 141 are stacked in alternately facing and opposing relationship about rod 136 forming a disc spring bias means 140 urging head 135 toward an upper end of chamber 125 with the first sight band 132 out of view through the sight openings 139 in the no-load configuration shown. Under the influence of a load on the hook 112, head 135 is downwardly deflectable against the washers 141 in chamber 125 whereby the first sight band 132 comes into view through the openings 139. When a load equal to the rated load capacity is applied to the hook 112, the entire expanses of openings 139 are covered by the first sight band 132.

A circumferential shoulder 124 is located on side wall 123 in chamber 125 beneath the sight openings 139 in position to intercept the lower, outer peripheral edge of head 135 after the first sight band completely fills the sight openings 139. Shoulder 124 prevents further deflection of head 135 as overload condition is imposed upon hook 112, and so prevents the complete flattening of the bias means 140.

Load indicator 110 has a swivel capability provided by a bearing assembly 143 disposed between the lowermost Belleville washer 141 and the interior of end wall 133. Needle bearings 146 are set between a lower race 145 and an upper race 144. Lower race 145 bears against end wall 133, while upper race 144 is in engagement with the lowermost Belleville washer 141. The upper, central section of head 135 has a recess 150 which, in the no-load configuration, accommodates a central, downwardly extended portion 151 of adapter plug 126. A plurality of needle bearings 152 bear between the upper, outer peripheral face of head 135 and the lower, outer peripheral face of the plug 126 adjacent the downwardly extended portion 151 in the no-load configuration. Bearings 152 assist bearing assembly 143 in imparting a swivel capability to hook 112 in the no-load configuration.

Shank 115 of hook 112 is of the cylindrical, threaded variety. Rod 136 of plunger assembly 122 has a downwardly open, cylindrical threaded bore 148 specifically adapted to threadably receive shank 115 of hook 112 to securely assemble hook 112 to the load indicator 110.

First and second sight bands 132 and 134 are colored distinctively from one another, as red and green, respectively, presenting a readily ascertainable interface through sight openings 139. The Belleville washers 141 can be assembled in chamber 125 under a 10 percent spring deflection, and so, by design, can undergo a deflection to a 75 percent spring value upon deflection to a full load condition. The fatigue life of the disc spring is thus maximized.

The embodiments of the invention in which an exclusive property or privilege is claimed are defined as follows:

1. A load indicator usable with load lifting machinery having a rated load capacity and connectable between a load line and a load handling member of the machinery, said indicator including:

a housing having a generally upright side wall partially defining a chamber, said housing having a lower end closed by an end wall and an upper end connectable to a load line;

said housing end wall being provided with an opening;

first connecting means securing a load line to said housing;

a deflectable plunger assembly located in said chamber and extending therefrom;

said deflectable plunger assembly being vertically movable in said chamber relative to said housing and freely rotatable in said chamber relative to said housing;

said housing side wall being provided with at least one sight opening permitting viewing said plunger assembly in the chamber from outside of the housing;

said plunger assembly having a transverse head with a side wall portion visually distinct from the outside of said housing side wall adjacent the sight opening and vertically intermediately movable in said chamber between a position toward the upper end of the chamber out of view through said opening and a position toward the lower end of the chamber totally covering said opening from within the chamber;

said plunger assembly having rod means secured to the head and extending outward of the chamber and housing through said end wall opening such that vertical movement of that portion of the rod means located outward of the chamber and housing results in directly corresponding movement of the transverse head in the chamber;

second connecting means on the rod means connecting it to a load handling member, said second connecting means including a threaded opening in said rod means in engagement with a threaded shank of the load handling member;

bias means in said chamber disposed between said head and a portion of the housing biasing said head toward the upper end of the chamber to locate said visually distinct side wall portion in the out-of-view position, said bias means including a disc spring located in said chamber assembled in said chamber under a percentage of spring deflection when said side wall portion is in the out-of-view position;

swivel bearing means disposed between said bias means and said portion of the housing to facilitate free rotation of the plunger assembly in said chamber relative to said housing when said plunger assembly is vertically deflected responsive to a load;

said head being vertically movable in said chamber against the action of the biasing means responsive to a tension load between the load line and the load handling member a distance representative of the extent of loading on the load handling member as compared to a rated load capacity toward said position with said side wall portion totally covering said opening;

said bias means being linearly calibrated to provide biasing force equal to a preselected load value upon movement of said visually distinct side wall portion from said out-of-sight position to said position totally covering said opening; and a circumferential shoulder located on the side wall in the chamber in position to intercept said head and prevent further movement thereof after said side wall portion moves to said position totally covering said opening.

2. The indicator of claim 1 including: a sleeve connected to said head side wall and extending therefrom to totally cover said opening when said head is in its out-of-view position, said sleeve and head side wall being visually mutually distinguishably color coded and presenting a color interface viewable through said opening.

3. The indicator of claim 1 including: a second visually distinct side wall portion on said head and covering any portion of the opening not covered by the first visually distinct side wall portion.

4. The indicator of claim 1 wherein: said disc spring includes a plurality of Belleville washers stacked in alternately facing and opposing relationship surrounding said rod means.

5. The indicator of claim 4 wherein: said disc spring bears against said head and said swivel bearing means, said swivel bearing means being disposed between said disc spring and said housing end wall in said chamber.

6. The indicator of claim 1 including: an adapter plug secured to said housing, closing the upper end of said chamber and constituting part of said first connecting means.

7. The indicator of claim 1 wherein: said swivel bearing means is located in said chamber in bearing relationship to said end wall thereof; said disc spring bears against said head and said swivel bearing means; and said housing includes a second end wall closing the upper end of the chamber, and second swivel bearing means in said chamber disposed between the second end wall and said head to permit free rotation of said plunger assembly in said housing when said visually distinct side wall portion is located in said chamber in said position toward the upper end of said chamber out-of-view through said opening.

8. The indicator of claim 7 including: a sleeve connected to said head side wall and extending therefrom to totally cover said sight opening when said head side wall is in its out-of-view position, said sleeve and head side wall being visually mutually distinguishably color coded and presenting a color interface viewable through said opening.

9. The indicator of claim 7 including: a second visually distinct side wall portion on said head and covering every portion of the sight opening not covered by the first visually distinct side wall portion.

* * * * *

UNITED STATES PATENT AND TRADEMARK OFFICE
CERTIFICATE OF CORRECTION

PATENT NO. : 4,102,295
DATED : July 25, 1978
INVENTOR(S) : Edward J. Crook, Jr. et al It is certified that error appears in the above-identified patent and that said Letters Patent are hereby corrected as shown below:

In the Abstract of the Disclosure, line 16, after "color", insert --just--.

Column 5, line 68, "33" should be --35--.

Column 7, line 44, "leading" should be --loading--.

Signed and Sealed this

Thirteenth Day of February 1979

[SEAL]

Attest:

RUTH C. MASON
Attesting Officer

DONALD W. BANNER
Commissioner of Patents and Trademarks